United States Patent
Burton et al.

(10) Patent No.: US 7,221,308 B2
(45) Date of Patent: May 22, 2007

(54) JOINT STARS EMBEDDED DATA LINK

(75) Inventors: Dale Edward Burton, Melbourne, FL (US); Michael Bartlett Addison, Melbourne, FL (US); Christopher Sean Duffey, Titusville, FL (US); Paul Arthur Henkel, Indialantic, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 151 days.

(21) Appl. No.: 11/109,442

(22) Filed: Apr. 19, 2005

(65) Prior Publication Data

US 2006/0232463 A1    Oct. 19, 2006

(51) Int. Cl.
*G01S 13/78* (2006.01)

(52) U.S. Cl. ............ 342/42; 342/44; 342/45; 342/51; 342/196; 342/179

(58) Field of Classification Search ........... 342/42, 342/44, 45, 51, 179, 196
See application file for complete search history.

(56) References Cited

U.S. PATENT DOCUMENTS

| | | | |
|---|---|---|---|
| 3,344,420 A | | 9/1967 | Arsove |
| 3,713,149 A | * | 1/1973 | Bruner et al. ............ 342/88 |
| 3,750,168 A | * | 7/1973 | Schrader et al. .......... 342/30 |
| 3,969,725 A | * | 7/1976 | Couvillon et al. ......... 342/47 |
| 4,006,477 A | * | 2/1977 | Yost et al. ............... 342/51 |
| 4,092,603 A | | 5/1978 | Harrington |
| 4,144,534 A | | 3/1979 | Prickett et al. |
| 4,156,876 A | | 5/1979 | Debuisser |
| 4,210,910 A | | 7/1980 | Wohlers |
| 4,333,080 A | | 6/1982 | Collins et al. |
| 4,367,458 A | * | 1/1983 | Hackett ............... 340/539.16 |
| 4,507,659 A | | 3/1985 | Lewis et al. |
| 4,566,010 A | | 1/1986 | Collins |
| 4,733,238 A | | 3/1988 | Fiden |
| 4,954,829 A | | 9/1990 | Fiden |
| 5,014,061 A | * | 5/1991 | Ghose .................... 342/45 |
| 5,047,784 A | | 9/1991 | Gerlach et al. |
| 5,093,663 A | | 3/1992 | Baechtiger et al. |
| 5,117,360 A | * | 5/1992 | Hotz et al. ............. 342/195 |
| 5,278,563 A | * | 1/1994 | Spiess .................... 342/44 |
| 5,298,962 A | | 3/1994 | Nourrcier |
| 5,355,513 A | * | 10/1994 | Clarke et al. ............ 455/20 |
| 5,376,939 A | | 12/1994 | Urkowitz |
| 5,389,933 A | | 2/1995 | Golinsky |
| 5,486,830 A | | 1/1996 | Axline, Jr. et al. |

(Continued)

FOREIGN PATENT DOCUMENTS

WO    WO 99/61937    12/1999

OTHER PUBLICATIONS

"A microwave noncontact identification transponder using subharmonic interrogation", Pobanz, C.W.; Itoh, T. Microwave Theory and Techniques, IEEE Transactions on vol. 43, Issue 7, Jul. 1995 pp. 1673-1679.*

*Primary Examiner*—John B. Sotomayor
(74) *Attorney, Agent, or Firm*—Robert P. Lenart, Esq.; Pietragallo Bosick & Gordon, LLP

(57) ABSTRACT

A system comprises a radar for producing a radar interrogation signal, a transponder for receiving the radar interrogation signal and producing a transponder signal including a first linear frequency modulated pulse having an increasing frequency and a second linear frequency modulated pulse having a decreasing frequency, and a processor for processing the transponder signal to determine a frequency offset between the radar interrogation signal and the transponder signal.

20 Claims, 4 Drawing Sheets

U.S. PATENT DOCUMENTS

| | | | |
|---|---|---|---|
| 5,508,705 A * | 4/1996 | Spiess | 342/44 |
| 5,525,993 A * | 6/1996 | Pobanz et al. | 342/51 |
| 5,649,296 A | 7/1997 | MacLellan et al. | |
| 5,657,022 A | 8/1997 | Van Etten et al. | |
| 5,910,785 A | 6/1999 | Normant | |
| 5,966,091 A | 10/1999 | Andersson | |
| 6,081,222 A | 6/2000 | Henkel et al. | |
| 6,107,910 A * | 8/2000 | Nysen | 340/10.1 |
| 6,114,971 A * | 9/2000 | Nysen | 340/10.3 |
| 6,192,222 B1 | 2/2001 | Greeff et al. | |
| 6,329,944 B1 | 12/2001 | Richardson et al. | |
| 6,396,434 B1 | 5/2002 | Takase et al. | |
| 6,567,038 B1 | 5/2003 | Granot et al. | |
| 6,573,982 B1 | 6/2003 | Pruitt | |
| 6,577,266 B1 | 6/2003 | Axline | |
| 6,670,909 B2 | 12/2003 | Kim | |
| 6,791,489 B1 | 9/2004 | Richardson et al. | |
| 6,822,605 B2 | 11/2004 | Brosche | |
| 6,943,680 B2 * | 9/2005 | Ward, Jr. | 340/506 |
| 2002/0196178 A1 | 12/2002 | Beard | |
| 2004/0150548 A1 | 8/2004 | Walmsley | |
| 2004/0178944 A1 | 9/2004 | Richardson et al. | |
| 2006/0017608 A1 * | 1/2006 | Ormesher et al. | 342/42 |
| 2006/0232463 A1 * | 10/2006 | Burton et al. | 342/42 |

* cited by examiner

JOINT STARS EMBEDDED DATA LINK

FIELD OF THE INVENTION

This invention relates to communications systems, and more particularly to such systems that communicate over a radar frequency band.

BACKGROUND OF THE INVENTION

Many identification systems are known which involve an interrogator transmitting a microwave or other radio frequency signal and one or more transponders, which reradiate the transmitted frequency, either unmodified or modified to some degree. For example, the interrogator may be a radar located in an aircraft and the transponder may be located on the ground or attached to a vehicle. In a military environment, such devices serve as useful sensors in battlefield "friendly fire" control. Commonly, such devices include programmable encryption circuitry operative to regulate the signal characteristics of the transponder signal in accordance with an encryption code.

Various enhancements to transponder systems have been proposed which enhance the effectiveness of those systems. For example, contemporary transponders utilize frequency conversion techniques whereby the transponder radiates a reply signal at a frequency different from the radar interrogation signal. In such a manner, the transponder signal is more easily segregated from the interrogation signal and reflected ground clutter. Other conventional enhancements include the use of coherent transponders that allow the reply signal to phase track the interrogation signal.

Pulse compression techniques are commonly used in radar systems to allow the use of long pulses to achieve high-radiated energy, while obtaining the range resolution of short pulses. For devices to communicate well via radio frequency (RF) signals, the carrier signals in the transmitted and received signals must be well-matched. In this context, well-matched signals are signals that have the same frequency and phase code. With respect to pulse compression of modulated signals, this matching is critical for adequate signal processing gain and data extraction at the receiver. Phase locked loops have been used in transponder designs to match the frequencies of received and transmitted signals. While theses designs are useful in some applications, they may not work well enough for devices with very low effective radiated power levels and at extreme operating ranges.

The Joint Surveillance Target Attack Radar System (Joint STARS) is a long-range, air-to-ground surveillance system designed to locate, classify, and track ground targets in all weather conditions. While flying in friendly airspace, Joint STARS can look deep behind hostile borders to detect and track ground movements in both forward and rear areas. Joint STARS includes an airborne platform with a multimode radar system and mobile Ground Station Modules (GSMs). The airborne platform carries a phased-array radar and is capable of providing targeting and battle management data to all Joint STARS operators, both in the aircraft and in the ground station modules.

There is a need for a data link that enables matching of transmitted and received signals in systems that include transponders that operate with low effective radiated power, such as the Joint STARS system.

SUMMARY OF THE INVENTION

This invention provides a system comprising a radar for producing a radar interrogation signal, a transponder for receiving the radar interrogation signal and producing a transponder signal including a first linear frequency modulated pulse having an increasing frequency and a second linear frequency modulated pulse having a decreasing frequency, and a processor for processing the transponder signal to determine a frequency offset between the radar interrogation signal and the transponder signal.

DETAILED DESCRIPTION OF THE INVENTION

Figure 1:
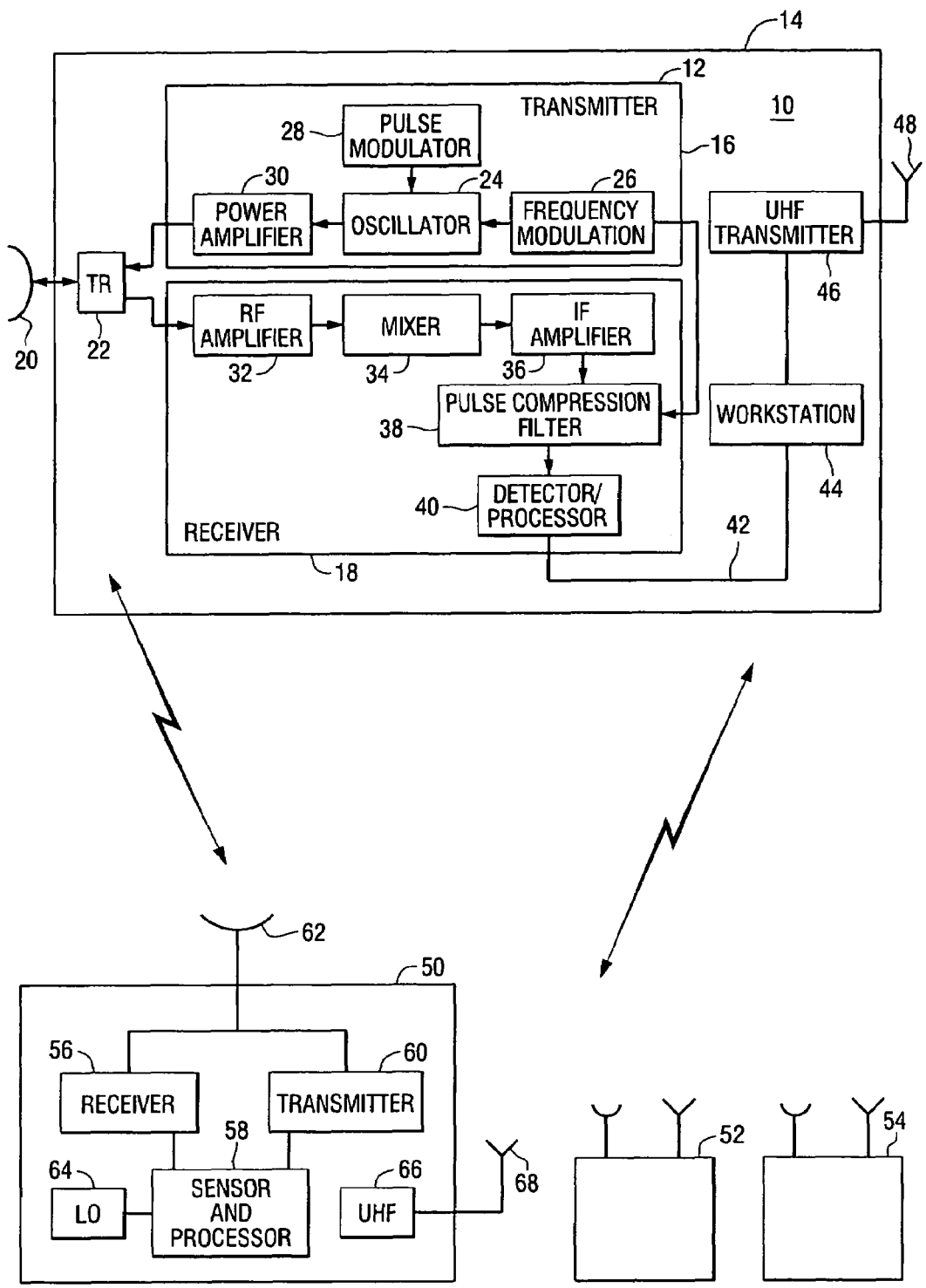
FIG. 1 is a block diagram of a system constructed in accordance with the invention.

Referring to the drawings, FIG. 1 is a block diagram of a radar system 10 constructed in accordance with the invention. In the embodiment of FIG. 1, the system includes a radar 12 mounted in an aircraft 14. The radar includes a transmitter 16 and a receiver 18 connected to an antenna 20 through a transmit/receive switch 22. The transmitter transmits pulses that are modulated using linear frequency modulation. To form the pulses, a carrier frequency provided by an oscillator or clock 24 is subjected to frequency modulation as illustrated by block 26 and pulse modulation as illustrated by block 28. A power amplifier 30 couples the modulated pulse signal to the antenna. The receiver includes an RF amplifier 32, mixer 34, IF amplifier 36, pulse compression filter 38 and detector/processor 40 to produce an output signal on line 42. The output signal can be provided to one or more workstations 44.

A UHF transmitter 46 is connected to an antenna 48 and provides a control channel. The workstation can be used to control the operation of the radar and UHF transmitter. A plurality of transponders 50, 52 and 54, also referred to as tags, unmanned ground sensors (UGS) or ground station modules (GSMs), are provided for supplying information to the radar. The transponders can be positioned, for example, at a fixed location on the ground, or on a ground or air vehicle.

The transponders include X-Band circuitry 56 for receiving interrogation signals from the radar, sensing and processing circuitry 58 for acquiring information, and circuitry 60 for transmitting response signals to the radar. The sensing and processing circuitry 58 may include, for example, a camera for capturing an image of a scene and a processor for processing the image. A first antenna 62 is provided for receiving interrogation signals from the radar and for sending response signals to the radar. A local oscillator 64 provides a frequency reference for the transmitted signals. A UHF receiver 66 and a UHF antenna 68 are also included to receive control channel information from the UHF transmitter in the aircraft.

The system can include the use of a Joint STARS centric UHF (or VHF) "Out of Band" Wake Up capability to extend the lifetime of battery operated units, as a UHF receiver will draw much less power than an X-Band receiver. The UHF channel allows addressing of individual units (either RF tags or UGS) and/or interrogation of all devices along with some encrypted command and control signals.

The UHF Command Link lowers the probability that ground devices will be detected, intercepted or spoofed. Adversaries would have to operate their countermeasures equipment in two distinct frequency bands. This would complicate the adversary's tasks and increase the cost of the required equipment. A base band modulator device (using, for example, FSK, ASK, or PCM) compatible with the airborne UHF AM transmitter can be integrated into the system so that operators can tightly coordinate ground device control with the corresponding radar interrogation.

Figure 2:
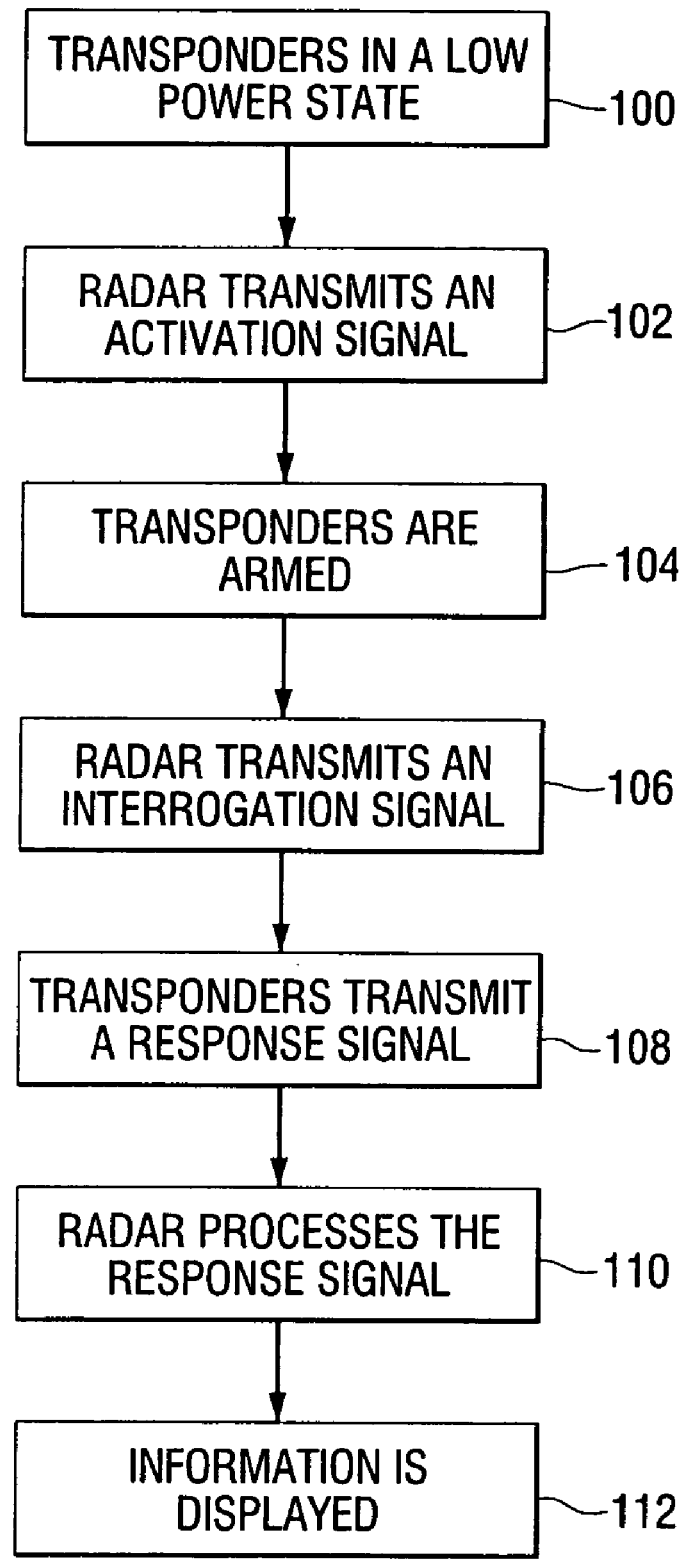
FIG. 2 is a flow diagram of the signal processing performed in the system of FIG. 1.

FIG. 2 is a flow diagram of the signal processing performed in the system of FIG. 1. Initially the RF tags listen in a low power state as shown in block 100, waiting for a UHF signal addressing "All Tags", "Individual Tags/UGS/UAVs" or subsets initiated by an airborne user as shown in block 102. This minimizes the "on time" of the ground units, which extends their operational lifetime by orders of magnitude and further lowers the chance of detection. In one embodiment the data bandwidth of the UHF control link is 300 to 3000 Hz. Since a very low data rate is required in this direction, this allows very low-cost and proven technologies to be used. Message transmit time can be limited to less than one second.

Upon receipt of an activation signal, all prompted tags arm 104 for tag identification (ID) and status interrogation. Then the radar transmits an interrogation signal 106 that prompts the tags for a return signal. The return signal can include information gathered by the transponder, for example, an image captured by a transponder sensor.

The data is embedded in the radar waveform. In this context, embedded data is frequency and phase coded information that resides within the nominal spectrum used by the generic radar waveform. For an adversary with minimal interception equipment such as spectrum analyzer, it would be very hard to tell the difference between the generic radar pulse and the "coded" response. Signal processing power in excess of the Joint STARS airborne signal processor would be required to decode the data in an operationally timely fashion. Embedding data in the radar waveform has many practical uses within radar systems in general, but more specific uses of this method would apply to the Joint STARS concept of operations.

The Tag/UGS responds 108 with a side-stepped, low level, spread spectrum signal, and the radar receives and processes tag ID and status information 110. A side-stepped radar signal is slipped in frequency by a discrete predetermined amount. The technique of side-stepping the transponder's response allows the response to be processed in the absence of ground clutter returns. This allows the transponder's response to use much less radiated power while maintaining the same signal to noise ratio. The information is then displayed 112 on the user's graphical workstation and can be tied to an additional database with supplemental information.

The invention can be used to communicate with RF tags or transducers, for example, to provide Blue Force ID and Status information as well as limited command and control messages and Brevity codes. In one example, when the airborne operators need to update the "Blue Force Data", they would command all transponders to "Turn On", and respond with only their Identification number during the next one minute via UHF radio command (102). Then the operator would command the radar to run a single "ID" scan using a radar pulse that is recognized by the transponder (106). The transponders would radiate their ID when queried (108). Conversely, if the operators require UGS data from a single unit, the UHF command arms only that unit by serial number, and commands it for data interrogation. A different type of radar mode then dwells only on the location of that unit and pulls the data up to the airborne radar for processing and display. These features are very important to maximize efficiency of the Joint STARS radar timeline as the system supports many user communities. It is important to note that the UHF commands are used to minimize the time the X-Band electronics are on. This is done to extend battery lifetime.

The same signaling scheme is possible, using the radar to control the ground units. For a Joint STARS centric application, the system can cue UGS moving target radar detectors and fuse the radar data with the UGS data to provide increased target identification and battlefield situation awareness.

The signal processing of this invention uses radar pulse compression techniques to extend the data link margin to support specified operational ranges while allowing the ground device to transmit at extremely low power levels. Additionally, the signal processing compensates for frequency offset or mismatch between transmit and receiver oscillators to allow the use of low-cost oscillators and designs in the ground units.

The transponders create their own waveforms for transmission to the radar from an on-board frequency source. A digitally controlled vector modulator can be included in the transponder processing circuitry, and used to modulate a carrier signal and can create almost any waveform. The transponder waveform is not phase coherent with the receiving radar. The radar signal processing power is used to phase match the transponder signal with the radar signal.

The transponder design is based on very low-cost standard quartz crystal carrier generation electronics. The transponders do not produce a carrier that is well-matched to the interrogating radar's frequency. Additionally, to some degree, this mismatch can be exploited to allow the signal processing to discriminate different or multiple radiators (other devices and RF tags using the same architecture), which are in the same range bin.

The system uses radar digital pulse compression techniques coupled with Differential Bi-Phase Shift Keying (DBPSK) modulation to facilitate high-speed long-range data transfer and device location. The ability to decode message streams received by the aircraft radar is a function of how well the frequency of the ground (transmitting) device and the radar receiver can be matched. Even with the highly accurate crystal driven phase locked loops, the frequency accuracy and drift over temperature cannot be controlled with the required precision to allow for proper demodulation. Using the signal processing power available from the airborne radar, frequency offsets can be calculated and compensated for in real-time, eliminating the need for expensive ground hardware.

A frequency-matching technique is provided to match the frequencies of the signals transmitted by the radar and the transponders. The signal transmitted by the transponder includes two linear FM chirps, one with increasing frequency and the other with decreasing frequency, on two sequential pulses. From these chirped pulses, a measure of the exact frequency can be made. The remainder of the data is processed using the measured frequency. The chirp nature of the waveform allows accurate frequency measurement at even longer ranges because of the pulse compression gain available. Additionally, the processing technique is robust enough to use the frequency measurement to identify multiple emitters in the same range bin. This solves the problem of multiple RF tags and/or devices in the same range bin by sorting out different emitters in the frequency domain instead of trying to resolve symbol codes or other types of modulations.

The system uses these chirped waveforms to allow lower Effective Radiated Power (ERP) and extend operational ranges, while lowering the chance of interception and exploitation by third parties. Additionally, the use of these chirped waveforms allows the use of a majority of the current Joint STARS signal processing to be exploited. The airborne signal processors do not need a major reconfiguration to switch between surveillance and data modes, since many of the discrete processes such as motion compensation, Fast Fourier Transforms (FFT), and pulse compression are the same as the normal processing.

Figure 3:
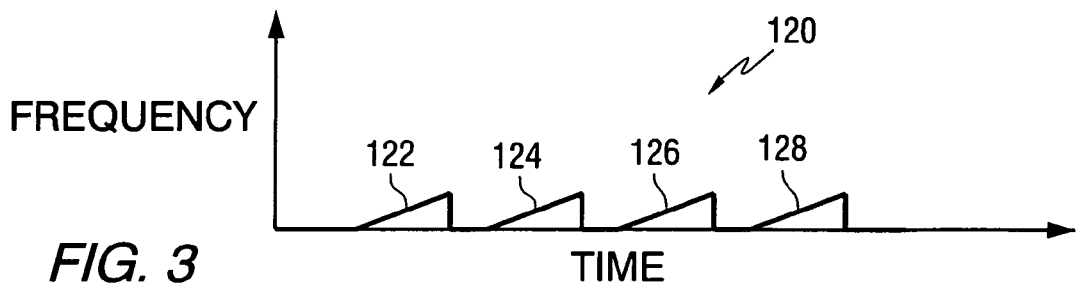
FIGS. 3 and 4 are waveform diagrams that show the type of waveforms used in the system of FIG. 1.
Figure 4:
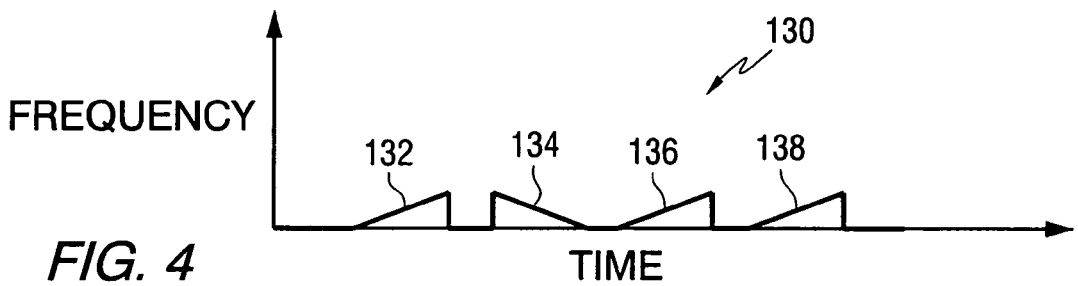

FIGS. 3 and 4 are waveform diagrams that show the type of waveforms used in the system of FIG. 1. Waveform 120 is a series of linear frequency modulated interrogation pulses 122, 124, 126 and 128 that are sent from the radar to the transponders. Waveform 130 is a series of linear frequency modulated response pulses 132, 134, 136 and 138 that are sent from the transponders to the radar. In one embodiment, the waveforms are transmitted at X-Band frequencies. The data to be sent by the transponders (ID and/or sensor data) is pre-processed into waveform data in the form of In-Phase and Quadrature (I&Q) control words to be clocked out to a digital vector modulator in the transponder. A pulse from the radar triggers the ground transponder response. A high-speed switch in the transponder opens and allows an X-Band Continuous Wave (CW) to pass to the vector modulator. This defines the return pulse's pulse width. The I&Q data is then simultaneously clocked to the control ports of the vector modulator to add the desired modulation. This particular design allows the ground device to create an almost infinite number of waveforms, but the greater successes have come with repeating phase modulated waveforms.

This invention exploits the frequency sensitivities of linearly modulated FM waveforms, and eliminates the need for a continuous wave (CW) signal that can be more susceptible to interference. In response to the interrogation signal, the transponder transmits two leader pulses, one having a positive slope linear FM modulation and one having a negative slope linear FM modulation. Linear FM (LFM) waveforms are typically employed in radar pulse compression schemes. A long pulse of linear FM can be "compressed" by the radar to improve the range resolution of the system.

When using LFM waveforms, any frequency offset of the returned pulse will result in a linear range measurement error. The direction of this error will be opposite for linear FM waveforms with opposite frequency slopes. This feature can be exploited to learn the true range, which will lie midway between the two range measurements.

A reference waveform is mathematically developed and retained in the radar signal processor's database. The reference waveform is calculated to match a signal programmed into the transponder. Upon receiving the two pulses, the radar receiver down-converts the received signal to baseband using the radar's coherent oscillator, and the radar signal processor performs a Fast Fourier Transform (FFT) correlation between each of the pulses and the reference waveform. This technique is a commonly used form of pulse compression used in radar ranging. The FFT correlation results in two peak indexes. Each of these peak indexes represents a range measurement to the device. The range measurements contain an induced range offset that is a function of the device's frequency offset from the radar. Because the slope of the linear FM waveforms are opposite for the two leader pulses, the direction of the range shift will also be equal and opposite. Therefore, the difference between the two resulting peak indexes is directly proportional to the frequency offset of the response signal with respect to the radar receiver. The mean index value also provides an accurate range (distance) measurement to the transponder.

The use of this signal processing technique allows for the accurate frequency compensation required to decode the received signal. The resulting measured distance to the transponder also allows the radar to communicate with devices anywhere in the radar field of view without prior knowledge of the transponder locations.

A user onboard the aircraft notes which tags have a status that requires additional data to be sent. The onboard user can then selectively build radar jobs for additional interrogation of the Data Tags in a UGS or an unmanned air vehicle (UAV) Video Frame Grabber, etc. Device(s) that will not be interrogated can be commanded to return to the sleep mode or can be allowed to time out to the sleep mode.

The individual linear frequency modulation wavelets (chirps) can be used to represent individual bits of data. The transponder creates a pulse containing many serial copies of a digitally generated linear FM code (also known as a polyphase code). A Bi-Phase Shift Key (BPSK) code is superimposed on this sequence by adding a bulk phase shift to each of these polyphase codes. The result is a string of codes which, upon receipt by the radar, will first be pulse compressed by the radar signal processor and then decoded to yield the original BPSK encoded data.

The signal processing not only compensates for oscillator mismatch between the transponder and integrating radar and but also for Doppler effects (which also cause frequency mismatch) caused by the relative motion of the radar and the transponder. This compensation is the key to the system's improved performance at lower Effective Radiated Power (ERP) and extended ranges.

This invention provides a system that allows all the components in the ground portion of any ground receive node to be integrated onto a very small integrated circuit (IC) chip set which includes the X-Band RF components required to provide signals to Joint STARS and/or other radars. The direct vector modulator can be implemented in a single chip that can meet the modulation needs of the ground node. This helps to reduce the size and power of the ground node to a man portable size.

The Joint STARS Embedded Data Link (JEDL) from the transponder to the radar is used to pass any type of binary data input of any size. The data link is designed primarily to receive large amounts of data from a ground-based device in the form of phase-coded waveforms. It transmits very long constant pulses with phase modulation. The radar uses a steered beam. The JEDL uses an open loop RF design and low-cost carrier generation electronics. The large signal processing of the receiving radar is used to compensate for the frequency mismatch.

The transponders emit waveforms that represent many bytes of information in a compressible frequency modulated signal. The phase noise of the signal and the correct frequency match allow the received signal to be mathematical compressed by the signal processing in the radar with adequate results to allow useful data to be extracted. For example, a signal that does not get enough signal processing pulse compression gain will not yield valid (decodable) data.

One of the key concepts of the data link is the use of a synthetic linear FM waveform that allows for the accurate location of the target as well as processing gain that reduces the peak power requirements of the transmitting unit. This reduction in peak power allows signals in the JEDL to be detected and decoded at longer ranges with a stealthier radio frequency signature. The theory, architecture, and operation of the invention are applicable to any Doppler radar with digital receiver outputs and adequate signal processing.

This invention also provides a unique image processing algorithm. When the transponder is used to send bit mapped images, errors in the data transfer are incorporated into the image. The errors show up as pixels with the wrong intensity or brightness. In this technique, increased error rates affect the image quality, but not it's usability to identify the target. The unique method of processing image data results in pixel intensity errors that the human eye can easily "integrate around".

Figure 5:
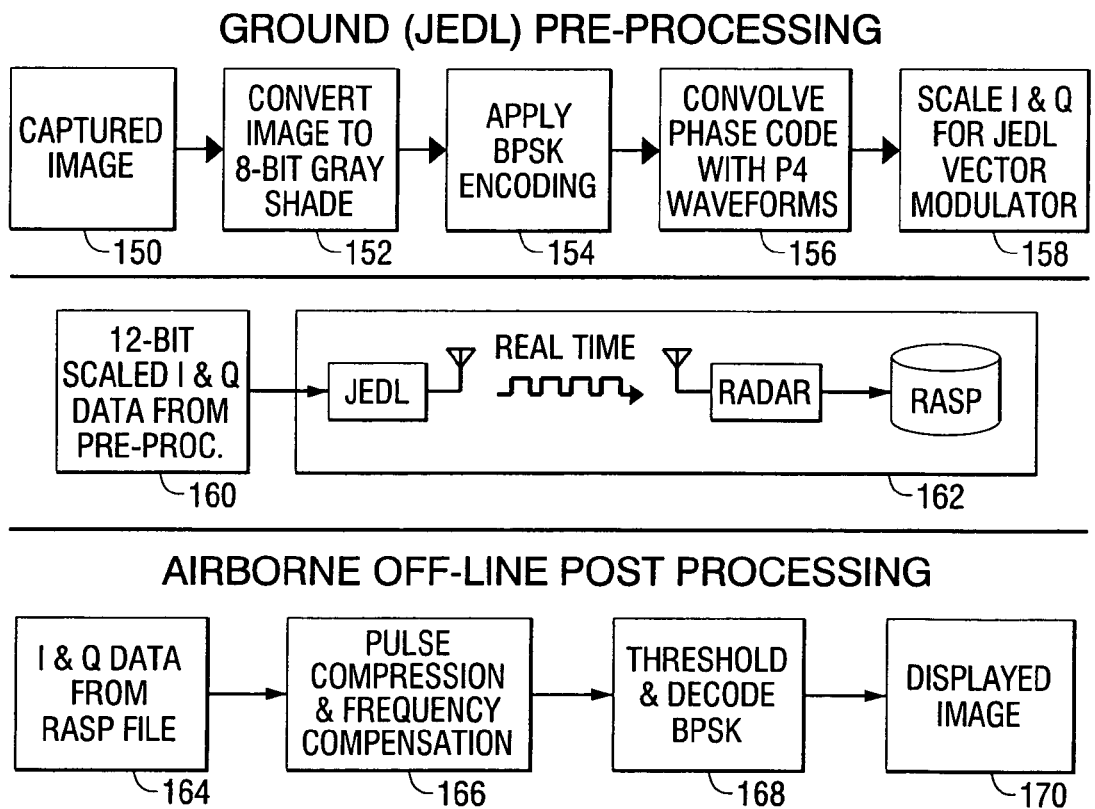
FIG. 5 is a block diagram of image processing performed in the system of FIG. 1.

FIG. 5 is a block diagram of the image processing performed in the system of FIG. 1. An image is captured as shown in block 150. The image is converted to 8-bit gray shade images as shown in block 152. BPSK is applied (block 154) and the image data is convolved with P4 waveforms (block 156). In-phase and quadrature components of the signal are scaled for a vector modulator in the transponder as shown in block 158. Twelve-bit scaled in-phase and quadrature components from the preprocessor, as shown in block 160, are delivered to the data link 162, over which they are transmitted to the radar. In the aircraft, in-phase and quadrature data from the Radar Airborne Scalable Processor (RASP) is stored in a file (block 164). Block 166 represents the generic pulse compression, frequency compensation and range correction described above. Block 168 represents the reconstruction of the image from the BPSK decoded data. Then the image is reconstructed as shown in block 170.

The image can be either a previously captured image or a 'live' image from a video camera's NTSC video stream. The data is reduced to a bit stream with sequential bytes (pixel positions) representing pixel intensities in a horizontal row (or portion of a row) of the picture. A number of bytes (typically 40 four bit bytes) can be selected and placed into a transit pulse with a differential bi-phase encoding scheme applied. Effectively, each bit is reduced to a single spread spectrum P4 (linear FM like chirp) code with a phase value representing a '0' or a '1'. These individual chirps are then broadcast in series in a non-overlapped fashion and can be individually pulse compressed and the phase data recovered.

The entire data block is transmitted in a series of pulses timed to correspond with the radar's receive windows (range gates). When the image is reconstructed, the data format is such that loss of, or bad decoding of, a pixel yields an intensity error (brighter or darker). The format is not header dependent, so that the loss of bit values only affects a single pixel. Even with a poor signal to noise ratio that creates a large amount of errors in the gray scale pixel brightness values, a useful picture is still created. Additional testing has been performed with completely random phase waveforms that replaced the P4 chirps. These were passed through known matched filters with approximately the same success.

Figure 6:
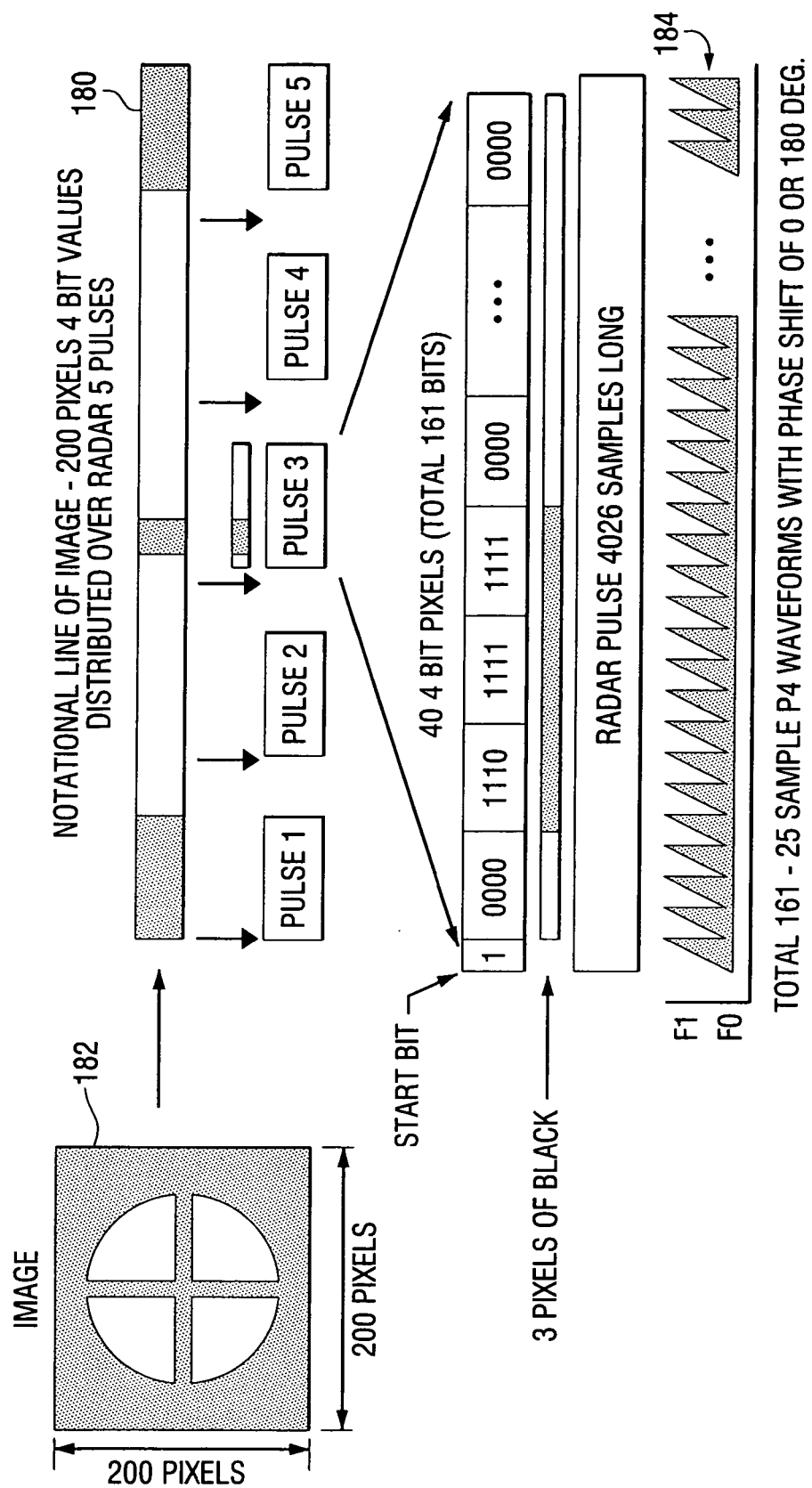
FIG. 6 is a schematic representation of image data coding in accordance with the invention.

FIG. 6 is a schematic representation of image data coding in accordance with the invention. In this example, all the wavelets have an increasing frequency and the phase is altered by 180 degrees to represent a one or a zero value for a bit. In FIG. 6, a line 180 of an image 182 is to be transmitted to the aircraft. The line in this example contains 200 pixels, each represented by a four bit value. The information in the line is to be transmitted in five pulses. Pulse number 3 includes 161 bits of information; including a start bit followed by 40 four bit data words that are representative of the pixel values. Note that the pulse 3 includes the last 3 black pixels of the center vertical line in the original image 182. In this example, the radar pulse is 4025 samples long. Waveform 184 illustrates the linear frequency modulated pulses used to transmit the data.

A variable number of bytes representing pixel intensities are possible depending on the range between the aircraft and sender. Additionally, quadrature phase encoding can be used to double the data rate. Link margin calculations show that this is possible at shorter to mid Joint STARS operational ranges. A multi-modulation and data rate algorithm could be implemented if required. Further, images can be tiled to create larger images with better resolution, and pixel averaging can be used to transmit larger images at lower resolution. Hence, the desired scenario can be tailored to the user's operational requirements.

The system can also communicate with other Joint STARS Aircraft radars directly. This application would allow the use of the Joint STARS large aperture, high gain radar antenna to pass data at a very high rate between the aircraft arriving on station and the aircraft ending its mission. With this application all the data from the preceding mission would be available for playback on the aircraft coming on station, thereby increasing situational awareness of time critical data.

The system can additionally communicate with unmanned remotely controlled or autonomous airborne surveillance vehicles, to upload individual video frames or video signals received from those vehicles, and to display them onboard the Joint STARS aircraft, and then transmit them off-board via Joint STARS SCDL, UHF Satcom, or IDM data links to any user.

The transponders (or some subset of the transponder electronics) can function as a waveform generator to simulate targets on the ground or in the lab. The immediate extension of this functionality would be to provide a Flight Line Check Out Unit for the receive chain of the radar. This capability can also be extended to ECM and ECCM threat detection and simulation.

The transponders can also function as a navigational aid to Joint STARS aircraft passing surveyed locations via the radar and signal processing to correct or improve target accuracy. This is especially useful in times when the Global Position System (GPS) is not available or degraded.

This invention provides a low-cost transponder system, including transponders that may be selectively excited or otherwise powered in accordance with a predetermined schedule of operation. As such, a transponder system in accordance with the present invention may remain in a sleep mode until a response is desired in accordance with a preset schedule or in response to wake signals from an interrogating radar. The transponder system generates a reply signal, in response to the interrogation signal, in the same frequency band so as to be difficult to detect. The transponder system can function in cooperation with a variety of different types of antenna systems including omni-directional, mechanically steered, or electronically steered antenna systems. The transponders may be vehicle mounted or man portable.

The transponder provides communications signals that are embedded within radar interrogation and reply signals.

The radar interrogation signals are embedded within the radar bandwidth. The transponders include a receiver for extracting the transponder interrogation signal. The transponders may be selectively enabled in response to interrogation signals having particular frequencies and/or in accordance with preset date or time schedules. The transponder outputs may be generated shortly after receipt of the transponder interrogation signal. As such, the transponder reply signals are difficult to distinguish from the radar interrogation/reply signals.

The signal processing uses radar pulse compression techniques to extend the link margin to ranges that support Joint STARS's operational ranges while allowing the ground device to transmit at very low power levels. Additionally, the signal processing compensates for the frequency mismatch between transmit and receiver oscillators to allow the use of low-cost oscillators and designs in the ground units and exploitation of the powerful signal processing of the radar system.

The invention is not limited to the Joint STARS radar, but may be used with any radar system that provides the required signal processing to allow exploitation of the communication methods within the bandwidth of the radar radiolocation signals.

While the invention has been described in terms of several embodiments, it will be apparent to those skilled in the art that various changes can be made to the disclosed embodiments without departing from the scope of the invention as set forth in the following claims.

What is claimed is:

1. A system comprising:
    a radar for producing a radar interrogation signal;
    a transponder for receiving the radar interrogation signal and producing a transponder signal including a first linear frequency modulated pulse having an increasing frequency and a second linear frequency modulated pulse having a decreasing frequency; and
    a processor for processing the transponder signal to determine a frequency offset between the radar interrogation signal and the transponder signal.

2. The system of claim 1, wherein the processor performs a Fast Fourier Transform on the transponder signal to produce two indexes and uses the two indexes to determine the frequency offset between the radar interrogation signal and the transponder signal.

3. The system of claim 1, wherein the radar uses the frequency offset to match the frequency of the transponder signal with a reference signal in the radar.

4. The system of claim 1, wherein the transponder signal includes a processor for processing image data and the image data is transmitted to the radar in a series of pulses modulated with bits representative of intensity of pixels in rows of pixels in the image data.

5. The system of claim 1, wherein the transponder signal includes a series of pulses modulated with bits representative of intensity of pixels in a row of pixels in an image.

6. The system of claim 5, wherein the bits are coded using non-overlapped P4 codes.

7. The system of claim 5, wherein the series of pulses are linearly frequency modulated pulses.

8. The system of claim 5, wherein the series of pulses are sidestepped with respect to the radar interrogation signal.

9. The system of claim 1, wherein the first linear frequency modulated pulse and the second linear frequency modulated pulse are sequential.

10. A method comprising the steps of:
    producing a radar interrogation signal;
    receiving the radar interrogation signal and producing a transponder signal including a first linear frequency modulated pulse having an increasing frequency and a second linear frequency modulated pulse having a decreasing frequency; and
    processing the transponder signal to determine a frequency offset between the radar interrogation signal and the transponder signal.

11. The method of claim 10, wherein the step of determining frequency offset between the radar interrogation signal and transponder signal comprises the step of performing a Fast Fourier Transform on the transponder signal to produce two indexes and using the two indexes to determine the frequency offset between the radar interrogation signal and the transponder signal.

12. The method of claim 11, wherein a mean value of the indexes provides a range measurement.

13. The method of claim 10, further comprising the step of using the frequency offset to match the frequency of the transponder signal with a reference signal in a radar.

14. The method of claim 10, further comprising the steps of:
    processing image data; and
    transmitting the image data to a radar in a series of pulses modulated with bits representative of intensity of pixels in rows of pixels in the image data.

15. The method of claim 10, wherein the transponder signal includes a series of pulses modulated with bits representative of intensity of pixels in rows of pixels in an image.

16. The method of claim 15, wherein the bits are coded using non-overlapped P4 codes.

17. The method of claim 15, wherein the series of pulses are linearly frequency modulated pulses.

18. The method of claim 15, wherein the series of pulses are sidestepped with respect to the radar interrogation signal.

19. The method of claim 10, further comprising the step of compensating for the frequency offset in real time in the radar.

20. The method of claim 10, wherein the first linear frequency modulated pulse and the second linear frequency modulated pulse are sequential.

* * * * *